United States Patent
Datar

(10) Patent No.: US 9,924,344 B1
(45) Date of Patent: Mar. 20, 2018

(54) METHOD FOR PROVIDING ROAMING SERVICES IN WHICH THE HOME NETWORK USES S8HR MODEL FOR OUT-BOUND ROAMING WHILE THE VISITED NETWORK USES LBO MODEL FOR IN-BOUND ROAMING

(71) Applicant: Syniverse Technologies, LLC, Tampa, FL (US)

(72) Inventor: Prashant Datar, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 15/622,609

(22) Filed: Jun. 14, 2017

(51) Int. Cl.
| | |
|---|---|
| H04W 8/12 | (2009.01) |
| H04L 29/06 | (2006.01) |
| H04W 8/06 | (2009.01) |
| H04W 12/06 | (2009.01) |
| H04W 8/04 | (2009.01) |
| H04L 12/24 | (2006.01) |

(52) U.S. Cl.
CPC ............ H04W 8/12 (2013.01); H04L 65/1006 (2013.01); H04L 65/1016 (2013.01); H04L 65/1069 (2013.01); H04L 29/06 (2013.01); H04L 41/50 (2013.01); H04W 8/04 (2013.01); H04W 8/06 (2013.01); H04W 12/06 (2013.01)

(58) Field of Classification Search
CPC ....... H04W 8/082; H04W 8/02; H04W 40/00; H04W 48/18
See application file for complete search history.

(56) References Cited

U.S. PATENT DOCUMENTS

| | | | | |
|---|---|---|---|---|
| 8,295,830 | B1* | 10/2012 | Faccin | H04W 8/04 370/331 |
| 9,154,993 | B1* | 10/2015 | Breau | H04L 12/66 |
| 9,198,220 | B2 | 11/2015 | Sugimoto et al. | |
| 9,560,517 | B2 | 1/2017 | Keller et al. | |
| 9,654,964 | B1* | 5/2017 | Carames | H04W 12/06 |
| 2007/0060097 | A1* | 3/2007 | Edge | H04L 29/06027 455/404.1 |
| 2007/0232301 | A1* | 10/2007 | Kueh | H04W 8/082 455/433 |

(Continued)

FOREIGN PATENT DOCUMENTS

WO 2017001640 A1 1/2017

*Primary Examiner* — Dung Hong
(74) *Attorney, Agent, or Firm* — Abdriy Lytvyn; Smith & Hopen, P.A.

(57) ABSTRACT

A roaming method that enables the home network (HPMN) to use S8 Home Routed (S8HR) model for out-bound roaming while the visited network (VPMN) uses Local Breakout (LBO) model for in-bound roaming. An IMS Roaming Gateway (IR-GW) establishes an IMS bearer between the IR-GW and the home network's Packet Data Network Gateway (P-GW). The IR-GW replaces the source IP address on the SIP-Register message with the client IP address assigned to the UE by the HPMN P-GW. Upon receiving a SIP-Response message responsive to successful authentication of the UE with the HPMN, the IR-GW inserts its own IP address into the SIP-Response message and forwards it to the UE. IR-GW performs network address translation (NAT) between the source IP assigned to the UE by the VPMN and the client IP assigned to the UE by the HPMN.

19 Claims, 5 Drawing Sheets

(56) References Cited

U.S. PATENT DOCUMENTS

| | | | | |
|---|---|---|---|---|
| 2007/0263608 A1* | 11/2007 | Han | H04W 88/16 | 370/356 |
| 2010/0272063 A1* | 10/2010 | Kato | H04W 8/082 | 370/331 |
| 2011/0173332 A1* | 7/2011 | Li | H04L 12/14 | 709/227 |
| 2011/0225632 A1* | 9/2011 | Ropolyi | H04W 48/16 | 726/4 |
| 2011/0286384 A1* | 11/2011 | Sugimoto | H04W 80/04 | 370/328 |
| 2012/0044949 A1* | 2/2012 | Velev | H04W 8/082 | 370/401 |
| 2012/0099573 A1* | 4/2012 | Jalkanen | H04W 4/001 | 370/338 |
| 2013/0171974 A1* | 7/2013 | Bae | H04W 8/12 | 455/411 |
| 2013/0201933 A1* | 8/2013 | Dennert | H04W 8/082 | 370/329 |
| 2014/0169286 A1* | 6/2014 | Xu | H04W 8/02 | 370/329 |
| 2015/0050937 A1* | 2/2015 | Rosar | H04W 8/082 | 455/445 |
| 2015/0215766 A1* | 7/2015 | Russell | H04W 8/18 | 455/433 |
| 2015/0382289 A1* | 12/2015 | Rydnell | H04W 76/02 | 370/329 |
| 2016/0192175 A1* | 6/2016 | Van Veen | H04W 8/12 | 455/433 |
| 2016/0262006 A1* | 9/2016 | Keller | H04W 8/10 | |
| 2016/0373973 A1* | 12/2016 | Rommer | H04W 36/0033 | |
| 2017/0026334 A1* | 1/2017 | Youn | H04L 69/40 | |
| 2017/0156043 A1* | 6/2017 | Li | H04W 4/22 | |
| 2017/0188398 A1* | 6/2017 | Youn | H04W 8/12 | |

* cited by examiner

METHOD FOR PROVIDING ROAMING SERVICES IN WHICH THE HOME NETWORK USES S8HR MODEL FOR OUT-BOUND ROAMING WHILE THE VISITED NETWORK USES LBO MODEL FOR IN-BOUND ROAMING

BACKGROUND OF THE INVENTION

1. Field of the Invention

This invention relates to mobile communications. More specifically, the invention relates to a method of providing roaming services in which the Visited Public Mobile Network (VPMN) operates according to a Local Breakout (LBO) model while the Home Public Mobile Network (HPMN) operates under a S8 Home Routed (S8HR) model.

2. Brief Description of the Related Art

International travel has become ubiquitous, and those engaging in such travel create a strong demand for data roaming services when outside of their home mobile network coverage area. Thus, Internet Protocol Multimedia Subsystem (IMS) roaming is an important functionality that mobile providers strive to offer to their subscribers. Currently, there are two main models for providing roaming services: Local Breakout (LBO) and S8 Home Routed (S8HR). Each model has its advantages and limitations.

S8HR model uses the LTE S8 interface for transporting data traffic, such as voice over LTE (VoLTE), between the visited network and the home network. Many mobile network operators have a strong preference for S8HR model because it is easier to implement allowing faster deployment time. S8HR does not require IMS interoperability between the home network and the visited networks, thereby simplifying the deployment process. For this reason, S8HR model appeals to many mobile operators who want to quickly obtain a capability of providing IMS roaming services to their subscribers.

GSMA, however, identified several major shortcomings of S8HR model that significantly impede its widespread adoption. These limitations of S8HR are identified in *IMS Roaming and Interworking Guidelines*, Version 18.0 (Jan. 8, 2016). The following is a list of some of the limitations of the S8HR method identified by the GSMA: no service aware VPMN, no SRVCC (voice call continuity to GSM) support, no geo-local services in VPMN, no media path optimization possible for originated calls, no authenticated IMS emergency call, no decoded IMS Voice Call and SMS Lawful Interception or data retention in the VPMN. One key major shortcoming is that S8HR model does not enable the visited network to perform lawful interception of the in-bound IMS traffic to the roaming UE. Under S8HR, the visited network does not use IMS and, therefore, is not service aware and has no visibility into in-bound roaming IMS traffic. Another limitation of S8HR is that the un-authenticated roaming UEs are not able to make emergency calls.

In comparison to the S8HR model, the LBO model is much more complex and costly to deploy. However, under the LBO model, the visited network retains visibility into in-bound roaming IMS traffic and, therefore, is able to support lawful interception and can enable the UE to make emergency phone calls regardless of the UE's authentication status. Because certain jurisdictions legally mandate these capabilities, visited mobile networks in those geographic regions cannot use S8HR model.

Thus, what is needed in the art is method of providing roaming IMS services that enables the home network to use S8HR model while enabling the visited network to use LBO model, thereby maintaining its visibility into the in-bound roaming traffic. However, in view of the art considered as a whole, at the time the present invention was made, it was not obvious to those of ordinary skill in the field of this invention how such a roaming method could be implemented.

SUMMARY OF THE INVENTION

In one embodiment, the invention is a method of providing roaming services to a user equipment (UE) in a scenario in which a Visited Public Mobile Network (VPMN) uses a local breakout (LBO) model for providing in-bound roaming services while a Home Public Mobile Network (HPMN) uses a home-based routing (S8HR) model for providing out-bound roaming services. The VPMN receives a request from the UE—which is a subscriber of HPMN—to attach in the VPMN. A data channel for Internet Protocol Multimedia Subsystem (IMS) traffic is established between a VPMN Serving Gateway (S-GW) and a VPMN Public Data Network Gateway (P-GW). The VPMN P-GW assigns a source Internet Protocol address (IP address) to the UE, which enabling the VPMN to use the LBO model to provide in-bound roaming services to the UE. Thus, the VPMN maintains visibility into in-bound roaming traffic to the UE and is capable to perform lawful intercept and enables emergency calling.

The invention further includes an IMS Roaming Gateway (IR-GW). The IR-GW may be hosted by an Internet Packet Exchange framework (IPX), the VPMN, or the HPMN. The IR-GW detects an IMS SIP-Register message originating from the UE. The IR-GW establishes an IMS bearer with the HPMN P-GW, during which process, the HPMN P-GW assigns a client IP address to the UE. The IR-GW replaces the source IP address on the SIP-Register message with the client IP address assigned to the UE by the HPMN P-GW. The IR-GW inserts its own IP address into the PATH header of the SIP-Register message. The IR-GW then forwards the modified SIP-Register message to the HPMN.

In response to a successful authentication of the UE with the HPMN, the HPMN sends a SIP-Response message. The IR-GW receives the SIP response message, inserts its own IP address into the SERVICE-ROUTE header of the SIP-Response message, and forwards the SIP-Response message to the UE. The IR-GW then performs network address translation (NAT) between the source IP assigned to the UE by the VPMN P-GW and the client IP assigned to the UE by the HPMN P-GW. Thus, the signaling and media traffic must pass through the HPMN, thereby enabling HPMN to operate under S8HR model, while the VPMN retains visibility into the in-bound roaming traffic.

In an embodiment, to establish an IMS bearer, the IR-GW identifies the IP address of the HPMN P-GW. The IR-GW first identifies UE's IMSI within the IMS SIP Registration request message and then identifies MCC-MNC values within the UE's IMSI. IR-GW performs an IMS access point name (APN) domain naming system (DNS) query using the MCC-MNC values and receives the HPMN P-GW's IP address in response to the APN DNS query.

In an embodiment, to establish the IMS bearer with the HPMN P-GW, the IR-GW sends a Create-Session-Request message to the HPMN P-GW's IP address. The HPMN P-GW verifies with a Policy and Charging Rules Function (PCRF) of the HPMN that a policy corresponding to the UE permits establishing the IMS bearer. The HPMN P-GW then sends to the IR-GW a Create-Session-Response message along with the client IP address assigned to the UE. The HPMN P-GW also sends to IR-GW the IP address of the HPMN Proxy-Call Session Control Function (P-CSCF). After inserting the IR-GW IP address into the SIP-Register message, the IR-GW forwards the SIP-Register message to the HPMN P-CSCF IP address.

To authenticate the UE, the HPMN Serving-Call Session Control Function (S-CSCF) sends an authentication challenge to the UE, and the UE responds with a second SIP-Register message containing an authentication response.

To place an originating call, the UE sends a SIP-Invite message in the VPMN. The SIP-Invite message has a plurality of ROUTE headers. The SIP-Invite message is forwarded to the IR-GW based on the IR-GW IP address in a first ROUTE header. The IR-GW then forwards the SIP-Invite message via the IMS bearer to an IMS Core of the HPMN indicated in a second ROUTE header. The IMS Core of the HPMN routes the SIP-Invite request to a called party. The IR-GW NATs the signaling and media packets from a Session Border Controller (SBC) to the client IP address assigned to the UE by the HPMN P-GW.

To place a terminating call to the UE, a calling party dials the phone number of the UE. The IMS Core of the HPMN receives a SIP-Invite message from the calling party. The IMS Core adds ROUTE headers to the SIP-Invite message and routes the SIP-Invite message to the IR-GW according to the ROUTE headers. IR-GW routes the SIP-Invite message to a VPMN P-CSCF, which routes the SIP-Invite message to the UE. A successful response message is routed back to the calling party.

It is an object of the invention to enable the HPMN to use S8HR method for out-bound IMS roaming irrespective of the VPMN's preference. The HPMN would only require IMS roaming network integration with IPX+ (for IPX hosted IR-GW), not the VPMN.

It is another object of the invention to enable IMS out-bound S8HR access to multiple LBO VPMNs via a single IPX+ connection (for IPX hosted IR-GW).

Another object of the invention it to enable the VPMN to maintain visibility into all in-bound roaming IMS traffic to support lawful interception. The VPMN is also able to provide emergency calling services to the UE.

Call continuity is maintained because although HPMN uses S8HR, call continuity to GSM can continue to be supported due to the use of LBO in the VPMN.

Some of the limitations of the invention include the following. The media traffic for in-country and in-region calls continues to trombone via the HPMN, thereby incurring the same latency as S8HR. Also, additional latency is introduced due to the use of a new element (IR-GW) in the signaling and media paths. The added latency is not expected to affect overall performance as it would be of the order of a few microseconds.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
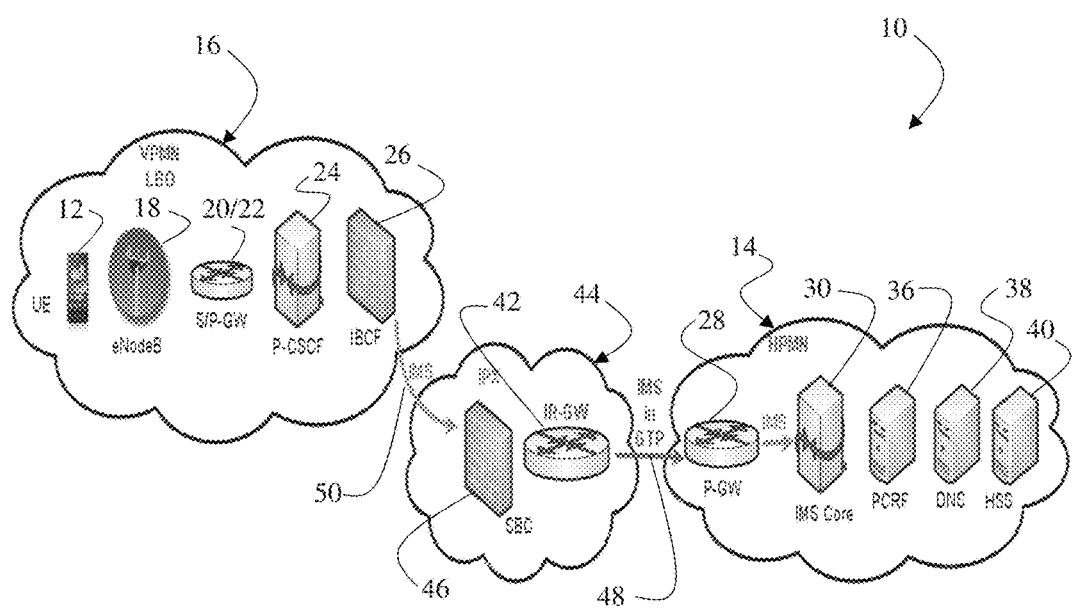
FIG. 1 is a diagram depicting the infrastructure of the communications networks according to the present invention.

FIG. 1 is a diagram illustrating the architecture of the communications system 10 according to the present invention. A User Equipment (UE) 12 is a subscriber of Home Public Mobile Network (HPMN) 14, wherein the HPMN 14 is an LTE network. UE 12 is roaming with a Visited Public Mobile Network 16, wherein VPMN 16 is also an LTE network. VPMN 16 includes an evolved node B (eNodeB) 18 configured to communicate with UE 12. eNodeB 18 is coupled to a VPMN S-GW 20, which in turn is coupled to a VPMN P-GW 22. VPMN P-GW 22 communicates with VPMN P-CSCF 24, which communicates with VPMN IBCF 26.

HPMN 14 includes an HPMN P-GW 28 in communication with an HPMN IMS Core 30. HPMN IMS Core 30 comprises HPMN S-CSCF 32 and HPMN P-CSCF 34 (not shown in FIG. 1). HPMN 14 further includes PCRF 36, Domain Name System (DNS) server 38, and HSS 40.

The invention introduces a custom-built function IR-GW 42. IR-GW 42 may be hosted by an IPX network 44, HPMN 14, or VPMN 16. IPX network 44 with IR-GW 42 functionality is referred to as IPX+. IR-GW 42 communicates with Session Border Controller (SBC) 46, which is in communication with VPMN IBCF 26. IR-GW 42 is configured to establish an IMS Bearer 48 with HPMN P-GW 28.

Figure 2:
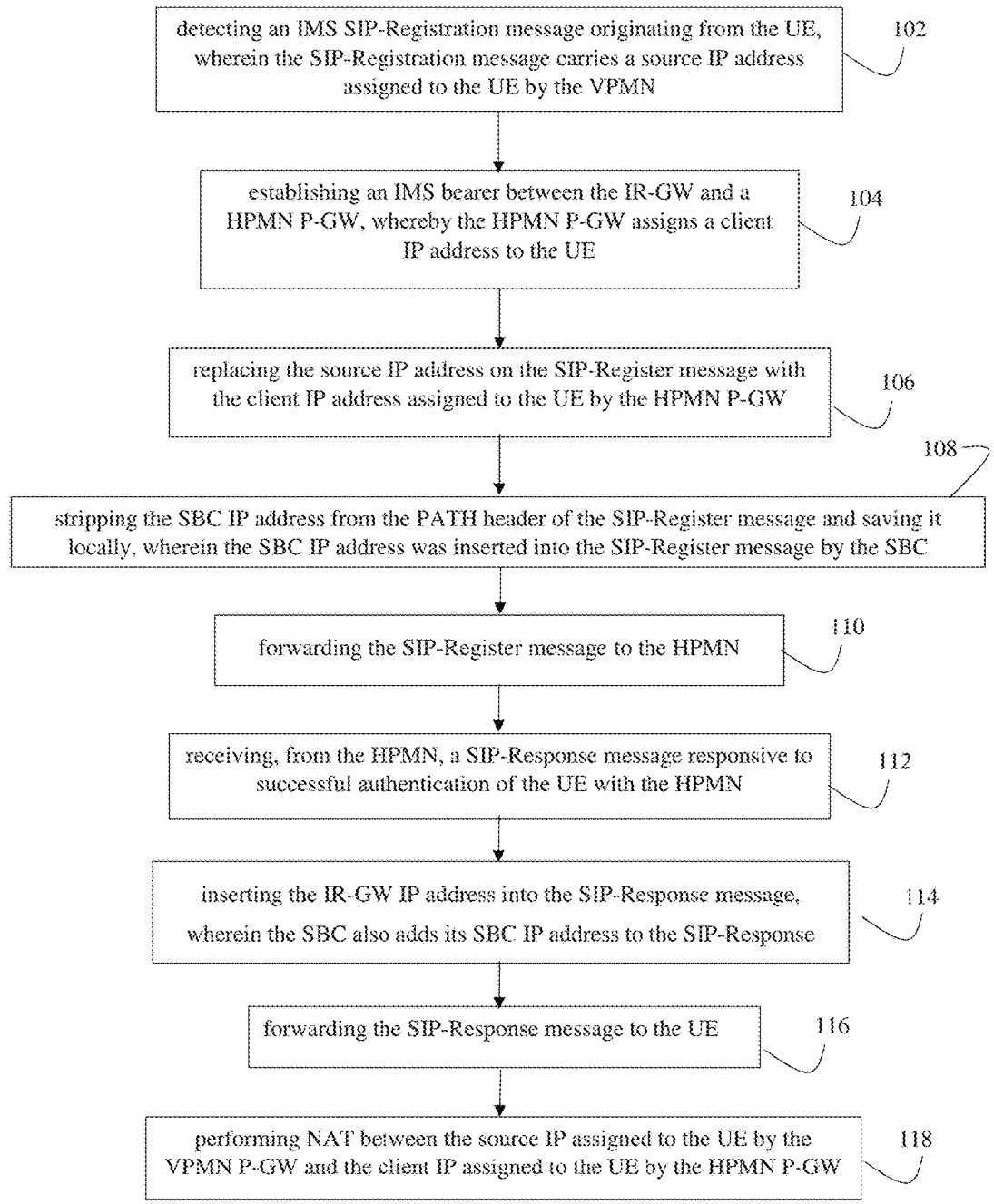
FIG. 2 is a flowchart depicting the functions of IR-GW.

IR-GW 42 is configured to perform the following functions schematically depicted in FIG. 2. In step 102, IR-GW 42 detects a new IMS SIP Registration message from a roaming UE 12, the SIP Registration message carrying a source IP address assigned to UE 12 by VPMN P-GW 22. IR-GW 42 launches an APN DNS query for the IMS APN using the IMSI identified from the IMS SIP-Register request message. The query returns an IP address of HPMN P-GW 28. In step 104, IR-GW 42 uses IP address of HPMN P-GW 28 to establish a GTP session (IMS bearer 48) on IMS APN with HPMN P-GW 28. HPMN P-GW 28 assigns a client IP address to UE 12.

In step 106, IR-GW 42 replaces the source IP address in the SIP-Register message with the client IP address assigned to UE 12 by HPMN P-GW 28. The SBC 46 adds its own IP address to the PATH header of the SIP-Register message. In step 108, the IR-GW 42 strips the SBC IP address from the PATH header and saves it locally. In step 110, the IR-GW 42 forwards the IMS SIP-Register request message through HPMN P-GW 28 to HPMN P-CSCF 34, whose IP address IR-GW 42 received during the GTP tunnel set-up.

In step 112, IR-GW 42 receives a SIP-Response message from the HPMN S-CSCF 32 responsive to successful authentication of UE 12 with HPMN 14. In step 114, IR-GW 42 and SBC 46 add their own IP addresses to the SERVICE-ROUTE header of the SIP-Response message. In step 116, IR-GW 42 forwards the SIP-Response message to UE 12. In step 118, IR-GW 42 NATs between the source IP address seen on the incoming IMS SIP Registration request message and the client IP address assigned to UE 12 by HPMN P-GW 28 during GTP session creation.

Registration Procedure

Figure 3:
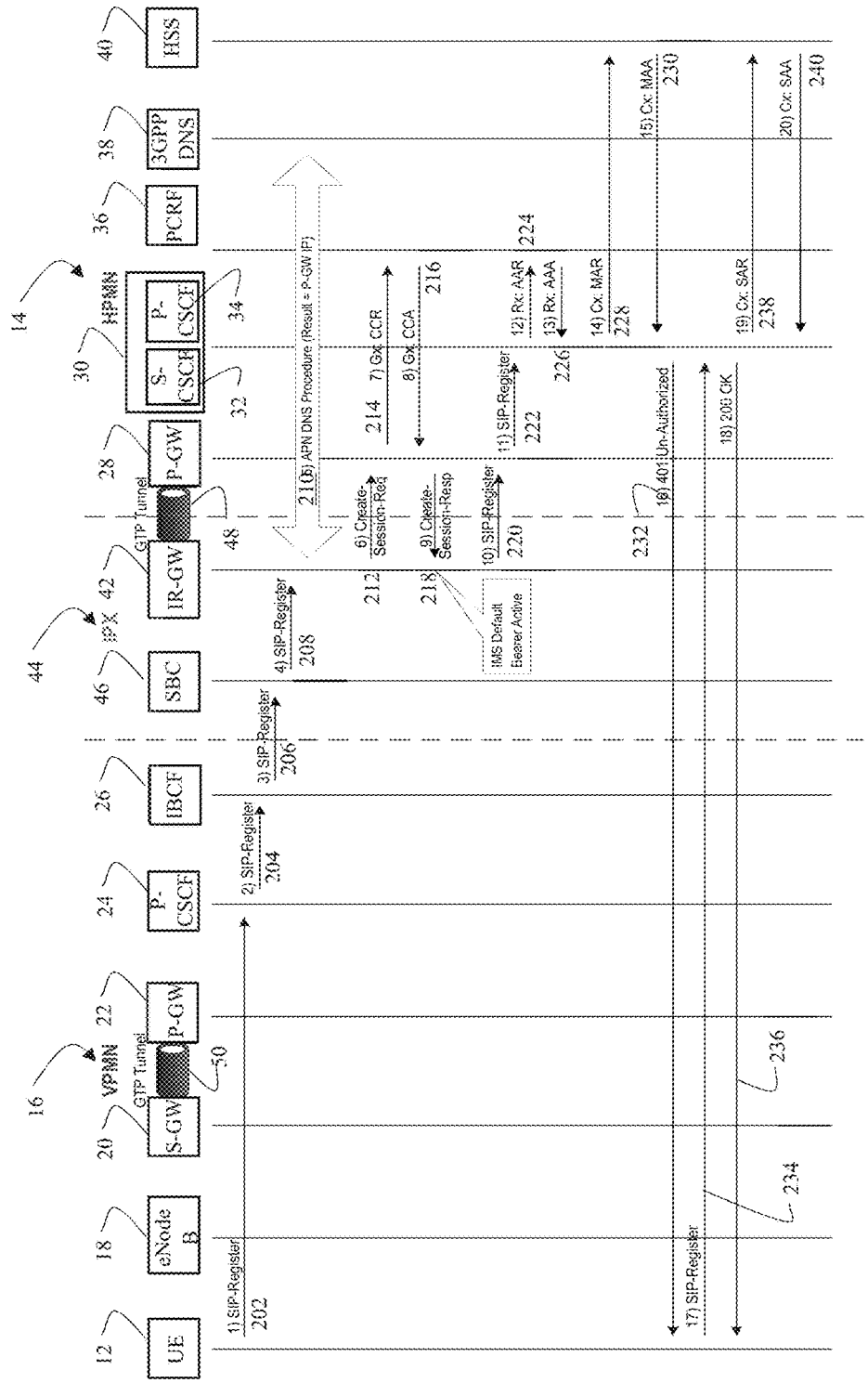
FIG. 3 is a signal flowchart depicting the procedure of registering the UE to receive roaming services according to the present invention.

FIG. 3 schematically illustrates the registration procedure of UE 12 according to the present invention. When UE 12 is first powered-up, it requests an LTE attach in VPMN 16. If a valid LTE roaming agreement exists between VPMN 16 and HPMN 14, of which UE 12 is a subscriber, the LTE attach is completed and a data channel for IMS traffic—VPMN IMS bearer 50—is opened between VPMN S-GW 20 and VPMN P-GW 22. VPMN P-GW 22 assigns a source IP address to UE 12. VPMN P-GW 22 sends an IP address of VPMN P-CSCF 24 to UE 12.

In step 202, after successful LTE attach in VPMN 16, UE 12 sends an IMS SIP-Register message towards VPMN P-CSCF 24, whose IP address it received form VPMN P-GW 22 as part of the LTE Registration procedure. On receipt of the SIP Register message, the VPMN P-CSCF 24 looks at the IMS Home Network Domain value on the SIP Register message. This value points to HPMN 14 of the subscriber, which means that UE 12 is an in-bound roamer. VPMN P-CSCF 24 then forwards the message to VPMN IBCF 28 in step 204.

In step 206, VPMN IBCF 28 forwards the SIP-Register message to the IPX+SBC 46. In alternative embodiment, VPMN IBCF 28 forwards the SIP-Register message to HPMN IBCF. In step 208, SBC 46 adds its own IP address to the PATH header and forwards the SIP-Register message to the IR-GW 42 based on the Request-URI value (Home Network Domain name).

In step 210, IR-GW 42 identifies the MCC-MNC values (first 6 digits of the IMSI) and launches an APN DNS query for the IMS APN based on the MCC-MNC values. This APN DNS query result provides the IP address of HPMN P-GW 28.

In step 212, IR-GW 42 sends a GTPv2 Create-Session-Request message towards HPMN P-GW 28 using the IMS APN to bring up an IMS bearer towards HPMN 14. On receiving this request, in step 214, HPMN P-GW 28 checks with HPMN PCRF 36 to make sure that UE 12's policy allows an IMS bearer to be created. In step 216 PCRF 36 allows creation of the IMS bearer. HPMN P-GW 28 assigns a client IP address to UE 12.

In step 218, HPMN P-GW 28 sends back the Create-Session-Response message along with UE 12's assigned client IP address and the IP address of the HPMN P-CSCF 34. At this point the GTP default bearer (IMS bearer) is established between IR-GW 42 and HPMN P-GW 28.

IR-GW 42 strips the SBC IP address form the PATH header and saves it locally. IR-GW 42 also changes the source IP address on the SIP-Register message to client IP address assigned to UE 12 by HPMN P-GW 28. In step 220, IR-GW 42 forwards the SIP-Register message to HPMN P-CSCF 34 within the HPMN IMS Core 30.

In step 222, HPMN P-CSCF 34 in the HPMN IMS-Core 30 opens a policy session with PCRF 36. to request network resources for service data flows. In step 224, the PCRF 36 confirms the policy session and provides charging and flow information to HPMN P-CSCF 34. HPMN P-CSCF 34 forwards the SIP-Register message to HPMN S-CSCF 32, both HPMN P-CSCF 34 and HPMN S-CSCF 32 are within IMS Core 30.

In steps 226-230, HPMN S-CSCF 32 retrieves the IMS authentication vectors from HPMN HSS 40 using the Multimedia-Auth-Request/Answer Cx interface Diameter messages. In step 232, HPMN S-CSCF 32 sends an authentication challenge to UE 12 via HPMN P-CSCF 34, IR-GW 42, SBC 46, VPMN IBCF 26 and VPMN P-CSCF 24. In step 234, UE 12 computes the authentication response and sends it to the IMS Core in another SIP-Register request. In step 236, HPMN S-CSCF 32 authenticates UE 12 and sends a SIP-Response message to UE 12. IR-GW 42 and SBC 46 add their own IP addresses in the SERVICE-ROUTE header to the SIP-Response message. In steps 238-240, HPMN S-CSCF 32 registers itself as UE 12's IMS server with HPMN HSS 40 using the Server-Assignment-Request/Answer Cx interface messages.

Mobile Originated Call

Figure 4:
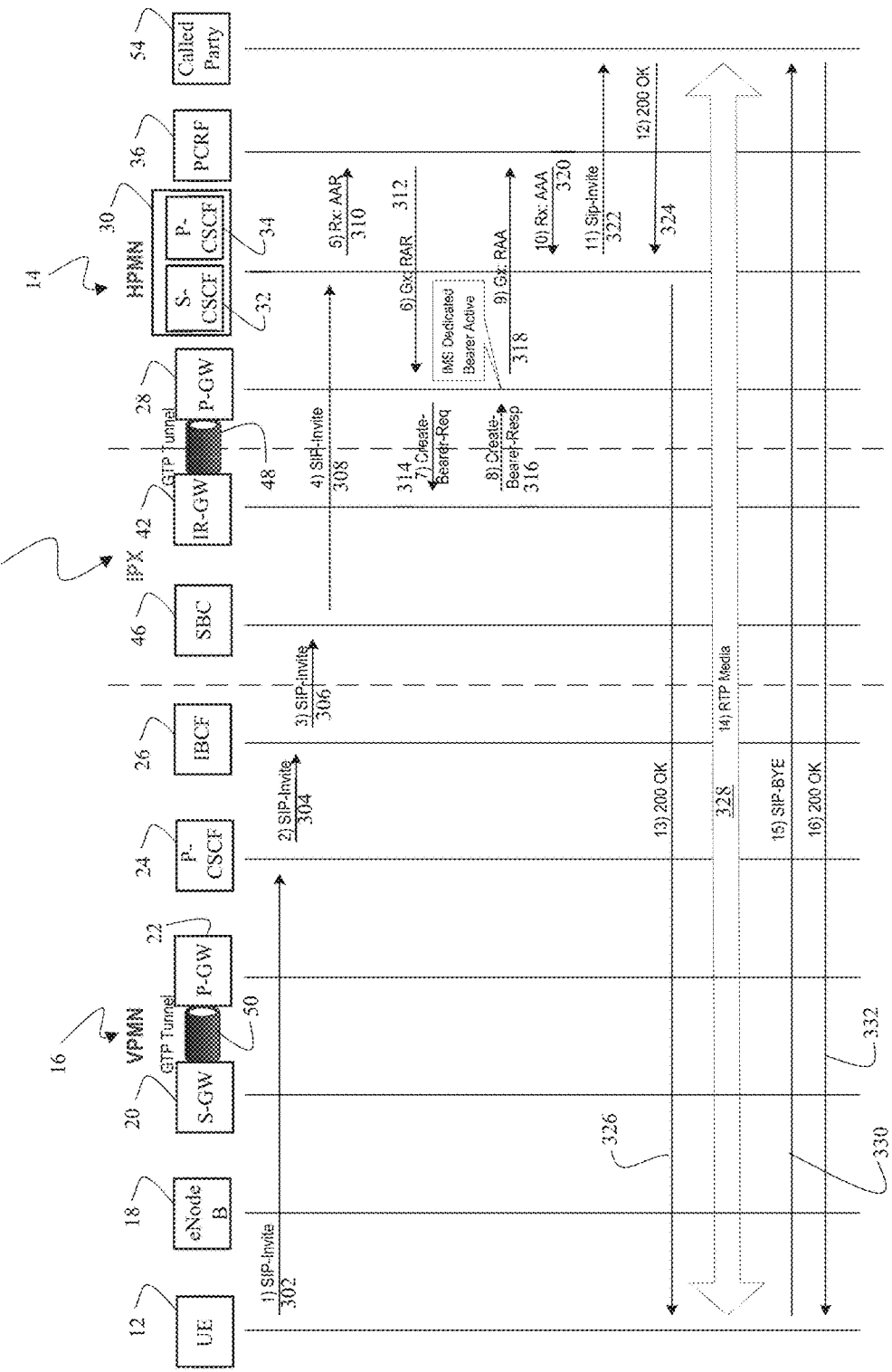
FIG. 4 is a signal flowchart depicting the procedure for connecting a mobile originated call.

FIG. 4 schematically illustrates a procedure for executing a mobile originated call according to the present invention. To initiate a call, in step 302 the IMS Registered UE 12 sends a SIP-Invite message via VPMN IMS bearer 50 to VPMN P-CSCF 24. The SIP-Invite message has ROUTE headers populated on it to ensure that it arrives at HPMN S-CSCF 32 within IMS Core 30. In step 304, VPMN P-CSCF 24 forwards the SIP-Invite message to the VPMN IBCF 26 based on the first ROUTE header. In step 306, VPMN IBCF 26 forwards the SIP-Invite to the IPX+SBC 46 based on the second ROUTE header.

In step 308, IPX+SBC 46 forwards the SIP-Invite to IR-GW 42 based on the third ROUTE header. IR-GW 42 maintains a mapping of each IMPU (PAI or FROM header) to the IMS bearer 48 (GTP TEID). IR-GW 42 uses this mapping to forward the SIP-Invite via the correct IMS bearer to HPMN IMS Core 30 indicated by the ROUTE header.

In step 310, HPMN P-CSCF 34 in HPMN IMS Core 30 requests network resources from PRCF 36 for the call. In step 312, PCRF 36 directs HPMN P-GW 28 to open a dedicated data bearer for the call with the required QoS. In step 314, HPMN P-GW 28 requests creation of a dedicated bearer to IR-GW 42. In step 316, IR-GW 42 brings up the dedicated bearer with HPMN P-GW 28. In step 318, HPMN P-GW 28 confirms the bearer setup with PCRF 36, which, in step 320, confirms the resource allocation to HPMN P-CSCF 34 in HPMN IMS Core 30.

In step 322, the SIP-Invite message is routed by HPMN IMS Core 30 to a Called-Party 54. In step 324, a Called-Party 54 answers the call successfully which is indicated back to UE 12 in steps 324 and 326. UE 12 then sends a SIP-ACK to the Called-Party (not shown in diagram).

In step 328, voice media flows over RTP packets bi-directionally. IR-GW 42 NATs the signaling and media IP from SBC 46 to the client IP address assigned to UE 12 by HPMN P-GW 28.

To terminate the call, in step 330, UE 12 requests call disconnection which is confirmed by Called-Party 54 in step 332. Gateways along the call-path tear down the dedicated bearers and inform PCRF 36 of the network resource release.

Mobile Terminated Call

Figure 5:
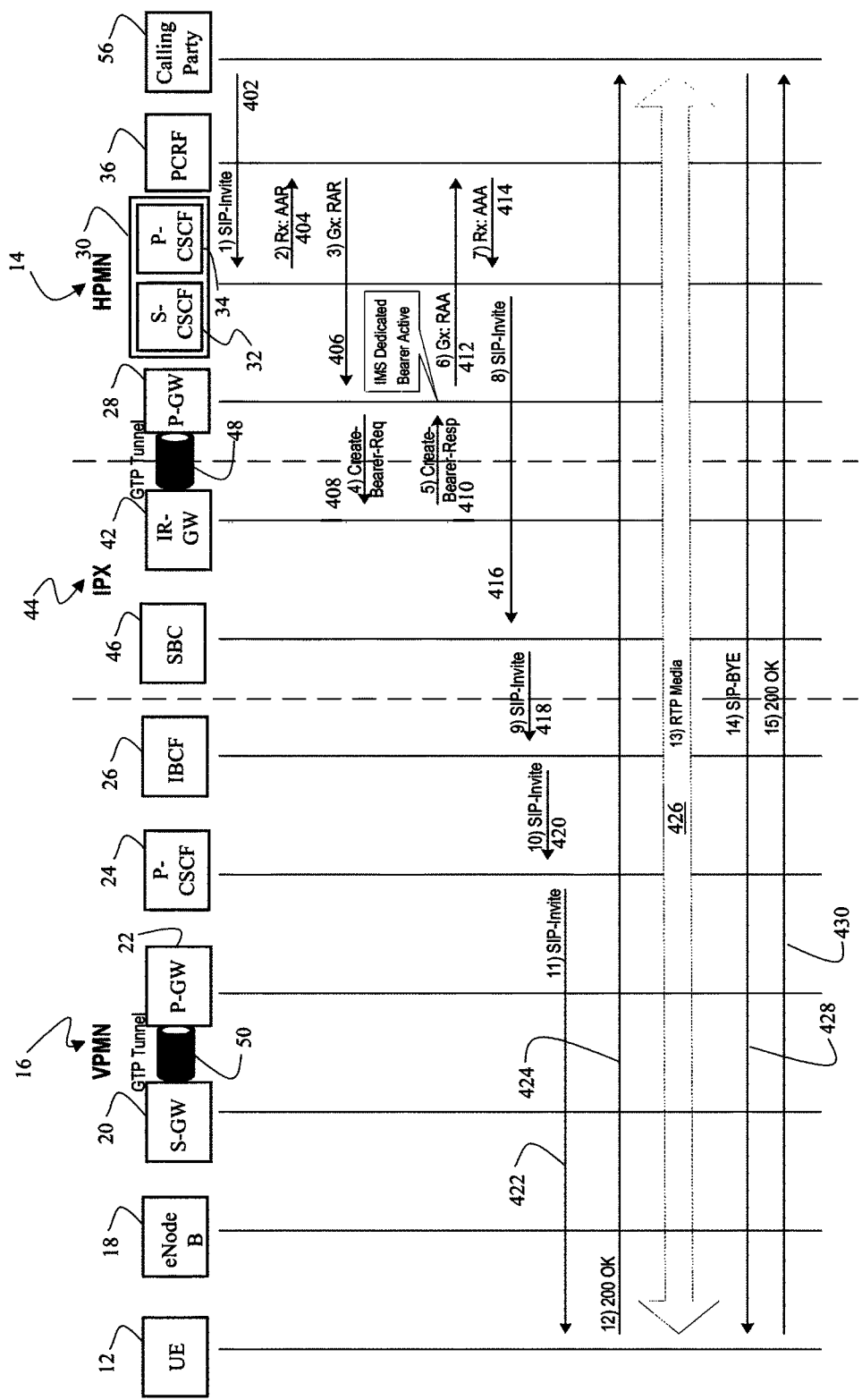
FIG. 5 is a signal flowchart depicting the procedure for connecting a mobile terminated call.

FIG. 5 schematically illustrates a procedure for executing a mobile terminated call according to the present invention. To place a mobile terminated call, Calling-Party 56 dials the roaming UE 12's MSISDN. In step 402, the associated SIP-Invite arrives at HPMN IMS Core 30 where the UE 12 is registered.

In step 404, HPMN P-CSCF 34 in HPMN IMS Core 30 requests network resources from PRCF 36 for the call. In step 406, PCRF 36 directs HPMN P-GW 28 to open a dedicated data bearer for the call with the required QoS.

In step 408, HPMN P-GW 28 requests creation of a dedicated bearer to IR-GW 42. In step 410, IR-GW 42 brings up the dedicated bearer with HPMN P-GW 28. In step 412, HPMN P-GW 28 confirms the bearer setup with PCRF 36, which the confirms the resource allocation to HPMN P-CSCF 34 in step 414.

In step 416, the SIP-Invite is sent by HPMN IMS Core 30 via the IMS bearer 48 to IR-GW 42 which appears as originating from the UE 12 to the HPMN IMS Core due to the NATing performed by the IR-GW 42. The IR-GW 42 forwards the SIP-Invite to the SBC 46 based on the SBC IP address in the PATH header from the Registration. In step 418, IPX+SBC 46 routes the SIP-Invite to VPMN IBCF 26. In step 420, VPMN IBCF 26 in turn routes the SIP-Invite to VPMN P-CSCF 24. This routing is also based on the next ROUTE header.

In step 422, VPMN P-CSCF 24 routes the SIP-Invite to UE 12. In step 424, UE 12 answers the call and the successful response is routed back to the Calling-Party. Calling-Party 56 then sends a SIP-ACK back to the UE 12 (not shown in diagram). In step 426, voice media flows over RTP packets bi-directionally. IR-GW 42 NATs the signaling and media IP from SBC 46 to the client IP addressed assigned to UE 12 by HPMN P-GW 28.

To terminate the call, in step 428, Calling-Party 56 requests call disconnection which is confirmed by UE 12 in step 430. Gateways along the call-path tear down the dedicated bearers and inform PCRF 36 of the network resource release.

The following is a list of session mapping data in IR-GW 42: subscriber IMSI, subscription APN, DNS assigned HPMN P-GW 28 address, GTPv2 Control Plane F-TEID (F-TEID-C), GTPv2 Bearer F-TEID (F-TEID-U), HPMN P-GW 28 assigned UE PDP-Address (client IP address), HPMN P-GW 28 assigned HPMN P-CSCF 34 IP address; IMS Home Network Domain Name, subscriber IMPU and SBC 46 IP address from PATH header of the SIP-Register message.

Hardware and Software Infrastructure Examples

The present invention may be embodied on various platforms. The following provides an antecedent basis for the information technology that may be utilized to enable the invention.

In an embodiment, IR-GW 42 is implemented using the existing EPC S-GW code base. An IMS is overlaid on the S-GW so as to detect IMS Registrations. IR-GW 42 software can be coded in C++. DPDK libraries may be used for media processing. Emulated vNICs may be used in case of virtualized deployments of IR-GW 42. SQLite is used for reporting performance information. Oracle DB is used for storing session data for signal tracing and reporting purposes. IR-GW 42 can be run on a stand-alone Red Hat Enterprise Linux (RHEL) server or on a virtualized machine running RHEL on a VMWare ESX hypervisor.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

GLOSSARY OF CLAIM TERMS

Access Point Naming (APN) is the assigning of identifying names (universal resource locators-URLs) to access points that allow names to identify node IP addresses within GSM and GPRS networks. An APN is composed of two parts: a network ID and an operator specific ID. The network ID identifies the service requested by a user in a network and the operator ID identifies the specific routing information.

Client IP Address is an IP address assigned to the UE by the HPMN P-GW.

Header is a component of a SIP message that conveys information about the message. A header is structured as a sequence of header fields.

Home Public Mobile Network (HPMN) is a network to which a roaming UE has a subscription.

Home Subscriber Server (HSS) is a server that can store and process subscription data and other information about each subscriber authorized to use the network.

IMS Core is the central network portion of a communication system that is based on IP multimedia service protocols. The core network primarily provides interconnection and transfer between edge networks.

IMS Roaming Gateway (IR-GW) is a custom-built function configured to facilitate IMS roaming of a UE when HPMN uses S8HR model for out-bound roaming while allowing the VPMN to maintain visibility into the in-bound roaming traffic.

International Mobile Subscriber Identity (IMSI) is a number assigned by a mobile system operator to uniquely identify a UE.

IP Multimedia Subsystem (IMS) is service based architecture that uses Internet protocol (IP) based systems to provide enhanced multimedia services. IMS evolved from the evolution of the 3rd generation mobile telephone standards that enabled users to access multimedia services using any type of access network that could use Internet protocols.

IP Packet eXchange (IPX) is a network used to exchange IP-based traffic. IPX interconnects multiple mobile networks through the use of common technical specifications based on IP.

Packet Gateway (P-GW) is a device or assembly that coordinates the control and adapts packet data transmission between a communication connection and another system. A packet gateway may adapt data formats and communication processes to the system with which it is communicating.

Policy Control and Charging Functions (PCRF) are the processes and charging event messages that are used to configure and modify the parameters of network elements. PCRF messages can control the authorization for services and report status information (monitoring) that confirms and tracks the services that are provided through a network.

Proxy Call Session Control Function (P-CSCF) is an entry point to the IMS domain and serves as the outbound proxy server for the UE. The UE attaches to the P-CSCF prior to performing IMS registrations and initiating SIP sessions.

Serving Call Session Control Function (S-CSCF) a SIP server located in the HPMN. S-CSCF uses the Diameter Cx interface to the HSS to download user profiles and upload user-to-S-CSCF associations.

Session Initiation Protocol (SIP)-Register message is a message sent from a UE used to register with a network.

Session Initiation Protocol (SIP)-Invite message is a message sent from a UE/calling party used to initiate a phone call with a called party.

Session Border Controller (SBC) is an interface to a network firewall that facilitates the secure hand-off of voice packets from one IP network to another IP network.

Serving Gateway (S-GW) is a device or assembly that coordinates the control and adapts data transmission between a device and a system. A serving gateway may adapt communication processes and the underlying data to the access method that is being used by the device or system with which it is communicating.

Source IP Address is an IP addressed assigned to the roaming UE by VPMN P-GW. The source IP address is included in the SIP-invite message.

User Equipment (UE) is a device that can connect to a communication system. Examples of UE devices include multimedia mobile telephones, personal computers, transceivers that are installed in vehicles or fixed wireless units.

Visited Public Mobile Network (VPMN) is a mobile network used by a mobile subscriber while roaming.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of providing roaming services to a user equipment (UE) in a scenario in which a Visited Public Mobile Network (VPMN) uses a local breakout (LBO) model for providing in-bound roaming services while a Home Public Mobile Network (HPMN) uses a home-based routing (S8HR) model for providing out-bound roaming services, the method comprising:
   receiving a request from the UE to attach in the VPMN, wherein the UE is a subscriber of the HPMN;
   establishing a data channel for Internet Protocol Multimedia Subsystem (IMS) traffic between a VPMN Serving Gateway (S-GW) and a VPMN Public Data Network Gateway (P-GW), wherein the VPMN P-GW assigns a source Internet Protocol address (IP address) to the UE, thereby enabling the VPMN to use the LBO model to provide in-bound roaming services to the UE;
   providing an IMS Roaming Gateway (IR-GW), the IR-GW configured to execute the steps comprising:
      detecting an IMS SIP-Register message originating from the UE;
      establishing an IMS bearer between the IR-GW and the HPMN P-GW, whereby the HPMN P-GW assigns a client IP address to the UE;
      replacing the source IP address on the SIP-Register message with the client IP address assigned to the UE by the HPMN P-GW;
      forwarding the SIP-Register message to the HPMN;
      receiving, from the HPMN, a SIP-Response message responsive to successful authentication of the UE with the HPMN;
      inserting the IR-GW IP address into the SIP-Response message;
      forwarding the SIP-Response message to the UE; and
      performing network address translation (NAT) between the source IP assigned to the UE by the VPMN P-GW and the client IP assigned to the UE by the HPMN P-GW;
   wherein data packets are transmitted to and from the UE via the HPMN, thereby enabling the HPMN to use the S8HR model to provide the out-bound roaming services to the UE.

2. The method of claim 1, wherein the IR-GW identifies an IP address of the HPMN P-GW by performing the steps comprising:
   identifying UE's IMSI within the IMS SIP Registration request message;
   identifying MCC-MNC values within the UE's IMSI; and
   performing an IMS access point name (APN) domain naming system (DNS) query using the MCC-MNC values;

receiving the HPMN P-GW's IP address in response to the APN DNS query.

3. The method of claim 1, wherein establishing an IMS bearer between the IR-GW and the HPMN P-GW comprises the steps of:
   the IR-GW sending a Create-Session-Request message to the HPMN P-GW;
   the HPMN P-GW verifying with a Policy and Charging Rules Function (PCRF) of the HPMN that a policy corresponding to the UE permits establishing the IMS bearer; and
   the HPMN P-GW sending to the IR-GW a Create-Session-Response message along with the client IP address assigned to the UE.

4. The method of claim 3, wherein responsive to the Create-Session-Request message, the HPMN P-GW sends a HPMN Proxy-Call Session Control Function (P-CSCF) IP address to the IR-GW, and the IR-GW, after inserting the IR-GW IP address into the SIP-Register message, forwards the SIP-Register message to the HPMN P-CSCF IP address.

5. The method of claim 1, wherein a Session Border Controller (SBC) inserts a SBC IP address into a PATH header of the SIP-Register message.

6. The method of claim 1, wherein the IR-GW inserts the IR-GW IP address and a Session Border Controller (SBC) inserts a SBC IP address into a SERVICE-ROUTE header of the SIP-Response message.

7. The method of claim 1, wherein an HPMN Serving-Call Session Control Function (S-CSCF) sends an authentication challenge to the UE, and the UE responds with a second SIP-Register message containing an authentication response.

8. The method of claim 1, wherein establishing an originated call from the UE comprises the steps of:
   the UE sending a SIP-Invite message in the VPMN, the SIP-Invite message having a plurality of ROUTE headers;
   forwarding the SIP-Invite message to the IR-GW based on the IR-GW IP address in a first ROUTE header;
   the IR-GW forwarding the SIP-Invite message to an IMS Core of the HPMN indicated in a second ROUTE header via the IMS bearer;
   the IMS Core of the HPMN routing the SIP-Invite request to a called party; and
   the IR-GW performing NAT for the signaling and data packets from a Session Border Controller (SBC) to the client IP address assigned to the UE by the HPMN P-GW.

9. The method of claim 1, wherein establishing a terminating call to the UE comprises the steps of:
   receiving, by an IMS Core of the HPMN, a SIP-Invite message from a calling party;
   the IMS Core adding ROUTE headers to the SIP-Invite message;
   routing the SIP-Invite message from the IR-GW to a Session Border Controller (SBC) based on a PATH header in SIP-Register message;
   routing the SIP-Invite message to a VPMN P-CSCF;
   routing the SIP-Invite message to the UE; and
   routing a successful response message to the calling party.

10. The method of claim 1, wherein the IR-GW is hosted by an Internet Packet Exchange framework (IPX), the VPMN, or the HPMN.

11. A communication system configured to provide roaming services to a User Equipment (UE), the communication system having an Internet Protocol Multimedia Subsystem Roaming Gateway (IR-GW) configured to perform the steps comprising:
   detecting an IMS SIP-Register message originating from the UE, the UE requesting to register in a Visited Public Mobile Network (VPMN), the UE being a subscriber of a Home Public Mobile Network (HPMN), wherein the SIP-Register message carries a source IP address assigned to the UE by the VPMN, thereby enabling the VPMN to use a Local Breakout (LBO) model to provide in-bound roaming services to the UE;
   establishing an IMS bearer between the IR-GW and a HPMN Packet Data Network Gateway (P-GW), whereby the HPMN P-GW assigns a client IP address to the UE;
   replacing the source IP address on the SIP-Register message with the client IP address assigned to the UE by the HPMN P-GW;
   forwarding the SIP-Register message to the HPMN;
   receiving, from the HPMN, a SIP-Response message responsive to successful authentication of the UE with the HPMN;
   inserting the IR-GW IP address into the SIP-Response message;
   forwarding the SIP-Response message to the UE; and
   performing network address translation (NAT) between the source IP assigned to the UE by the VPMN P-GW and the client IP assigned to the UE by the HPMN P-GW;
   wherein data packets are transmitted to and from the UE via the HPMN, thereby enabling the HPMN to use an S8HR model to provide the out-bound roaming services to the UE.

12. The communication system of claim 11, wherein the IR-GW identifies an IP address of the HPMN P-GW by performing the steps comprising:
   identifying UE's IMSI within the IMS SIP Registration request message;
   identifying MCC-MNC values within the UE's IMSI; and
   performing an IMS access point name (APN) domain naming system (DNS) query using the MCC-MNC values;
   receiving the HPMN P-GW's IP address in response to the APN DNS query.

13. The communication system of claim 11, wherein establishing an IMS bearer between the IR-GW and the HPMN P-GW comprises the steps of:
   the IR-GW sending a Create-Session-Request message to the HPMN P-GW;
   the HPMN P-GW verifying with a Policy and Charging Rules Function (PCRF) of the HPMN that a policy corresponding to the UE permits establishing the IMS bearer; and
   the HPMN P-GW sending to the IR-GW a Create-Session-Response message along with the client IP address assigned to the UE.

14. The communication system of claim 13, wherein responsive to the Create-Session-Request message, the HPMN P-GW sends a HPMN Proxy-Call Session Control Function (P-CSCF) IP address to the IR-GW, and the IR-GW, after inserting the IR-GW IP address into the SIP-Register message, forwards the SIP-Register message to the HPMN P-CSCF IP address.

15. The communication system of claim 11, wherein a Session Border Controller (SBC) inserts a SBC IP address into a PATH header of the SIP-Register message.

16. The communication system of claim 11, wherein the IR-GW inserts the IR-GW IP address and a Session Border Controller (SBC) inserts a SBC IP address into a SERVICE-ROUTE header of the SIP-Response message.

17. The communication system of claim 11, wherein establishing an originated call from the UE comprises the steps of:
- the UE sending a SIP-Invite message in the VPMN, the SIP-Invite message having a plurality of ROUTE headers;
- forwarding the SIP-Invite message to a Session Border Controller (SBC) based on a SBC IP address in a ROUTE header;
- forwarding the SIP-Invite message to the IR-GW based on the IR-GW IP address in a first ROUTE header;
- the IR-GW forwarding the SIP-Invite message to an IMS Core of the HPMN indicated in a second ROUTE header via the IMS bearer;
- the IMS Core of the HPMN routing the SIP-Invite request to a called party; and
- the IR-GW performing NAT for the signaling and data packets from a Session Border Controller (SBC) to the client IP address assigned to the UE by the HPMN P-GW.

18. The communication system of claim 11, wherein establishing a terminating call to the UE comprises the steps of:
- receiving, by an IMS Core of the HPMN, a SIP-Invite message from a calling party;
- the IMS Core adding ROUTE headers to the SIP-Invite message;
- routing the SIP-Invite message to the IR-GW according to the ROUTE headers;
- routing the SIP-Invite message to a VPMN P-CSCF;
- routing the SIP-Invite message to the UE; and
- routing a successful response message to the calling party.

19. The communication system of claim 11, wherein the IR-GW is hosted by an Internet Packet Exchange framework (IPX), the VPMN, or the HPMN.

* * * * *